United States Patent [19]
Yonezawa

[11] Patent Number: 5,979,267
[45] Date of Patent: Nov. 9, 1999

[54] CLAMPING DEVICE

[75] Inventor: Keitaro Yonezawa, Kobe, Japan

[73] Assignee: Kabushiki Kaisha Kosmek, Hyogo, Japan

[21] Appl. No.: 08/964,873

[22] Filed: Nov. 5, 1997

[30] Foreign Application Priority Data

Nov. 12, 1996 [JP] Japan .................................. 8-299172

[51] Int. Cl.⁶ .............................. G05G 5/06; B23B 5/22
[52] U.S. Cl. ............................. 74/531; 74/527; 279/4.07
[58] Field of Search ................................ 74/531; 269/32, 269/309; 29/56.6, 57, 281.1; 188/67; 279/4.01–4.12

[56] References Cited

U.S. PATENT DOCUMENTS

| | | | |
|---|---|---|---|
| 1,840,470 | 1/1932 | Schneider . | |
| 3,168,322 | 2/1965 | Dziedzic | 279/4.09 |
| 3,176,553 | 4/1965 | Schubert | 82/162 |
| 3,208,759 | 9/1965 | Firestone et al. | 279/4.04 |
| 3,533,636 | 10/1970 | Firestone et al. | 279/4.07 |
| 3,615,100 | 10/1971 | Banner | 279/4.08 |
| 3,802,713 | 4/1974 | Levy | 279/50 |
| 4,068,559 | 1/1978 | Schmid et al. | 409/233 |
| 4,347,753 | 9/1982 | Claussen et al. | 74/110 |
| 4,504,046 | 3/1985 | Yonezawa et al. | 269/24 |
| 4,708,297 | 11/1987 | Boers | 403/328 X |
| 4,948,105 | 8/1990 | Yonezawa | 269/32 |
| 5,018,916 | 5/1991 | Bauch et al. | 74/110 X |

FOREIGN PATENT DOCUMENTS

| | | | |
|---|---|---|---|
| 0 561 395 | 9/1993 | European Pat. Off. . | |
| 1 765 353 | 6/1972 | Germany . | |
| 37 07 046 | 9/1988 | Germany . | |
| 6-7868 | 3/1994 | Japan . | |
| 240863 | 1/1964 | Netherlands . | |
| 674860 | 7/1979 | U.S.S.R. | 269/32 |
| 548690 | 10/1942 | United Kingdom . | |
| 665123 | 1/1952 | United Kingdom | 269/32 |
| 1066211 | 4/1967 | United Kingdom . | |

*Primary Examiner*—Vinh T. Luong
*Attorney, Agent, or Firm*—Bacon & Thomas PLLC

[57] ABSTRACT

An annular collet (10) is externally fitted to a support rod (4) inserted into a housing (2), and an annular transmission member (14) is arranged around the collet (10) with an annular tapered clearance (C) interposed therebetween. A large number of balls (B) inserted into the annular tapered clearance (C) are pushed up by a pushing spring (17). When pressurized oil is supplied to a hydraulic actuation chamber (25), a clamping piston 24 moves the transmission member (14) downward, so that a tapered internal peripheral surface (15) of the transmission member (14) gets engaged with a tapered external peripheral surface (11) of the collet (10) while rolling the balls (B). Thereby, the collet (10) is diametrically contracted.

14 Claims, 5 Drawing Sheets

CLAMPING DEVICE

BACKGROUND OF THE INVENTION

1. Field of the Invention

The present invention relates to a clamping device of the type adapted to hold and fix a rod by a collet and is a technique favorable for clamping, for example a support rod of a work support for a machine tool at a predetermined height.

2. Description of the Earlier Technology

There is such a clamping device of this collet-type as constructed to diametrically contract the collet by engaging a tapered internal surface of a cylindrical transmission member with a tapered external surface of the collet and to hold and fix a support rod by that diametrically contracted collet (for example, Japanese Utility Model Publication No. 6-7868 proposed previously by the Assignee of the present Application).

By the way, when increasing the foregoing holding and fixing force, it is necessary to decrease a taper angle for engagement.

In the above-mentioned technique, however, when the taper angel for engagement is decreased, since a static friction force acting between the engaged surfaces is increased at the beginning of disengagement, the disengagement becomes impossible due to that large static friction force.

Therefore, in the prior art, the taper angle for engagement could be set merely to a small value from about 6 degrees to about 10 degrees, so that the increasing of the holding and fixing force was limited.

SUMMARY OF THE INVENTION

An object of the present invention is to provide a clamping device which is small in size but capable of exerting a large holding and fixing force.

For accomplishing the above-mentioned object, for example as shown in FIGS. 1 to 3 or FIG. 4, a clamping device according to the present invention is constructed as follows.

A collet 10 is externally fitted onto a rod 4 inserted into a housing 2. A tapered internal peripheral surface 15 of a transmission member 14 faces a tapered external peripheral surface 11 of the collet 10 from outside. And an annular tapered clearance C is formed between the tapered internal peripheral surface 15 and the tapered external peripheral surface 11. A large number of balls B are inserted into the annular tapered clearance C and arranged in a peripheral direction and in an axial direction. The transmission member 14 is moved by a first driving means F toward one end side of the axial direction to diametrically contract the collet 10 through the balls B by the transmission member 14. A stopper 22 prevents the diametrically contracted collet 10 from moving toward the one end side of the axial direction. The transmission member 14 is moved by a second driving means S toward the other end side of the axial direction to cancel the diametrical contraction of the collet 10.

It can be supposed that the balls B to be inserted into the annular clearance C are, in one case, inserted in the state kept in contact with one another in the peripheral direction and, in the other case, inserted in the state spaced apart at a predetermined interval in the peripheral direction. Further, it can be supposed that the balls B are, in one case, inserted in the state kept in contact with one another in the axial direction of the annular clearance C and, in the other case, inserted in the state spaced apart at a predetermined interval in the axial direction.

The foregoing first driving means F may be constructed from a clamping piston 24 illustrated in FIG. 1, a clamping spring 31 illustrated in FIG. 4 or the likes. The foregoing second driving means S may be constructed from a return spring 28 illustrated in FIG. 1, a return piston 32 illustrated in FIG. 4 or the likes.

In the above-mentioned construction, as shown in FIG. 1 (or FIG. 4), it is preferable to push the large number of balls B in the axial direction by a resilient member 17 (34 or 35) or to push the collet 10 to the stopper 22 by another resilient member 20.

The present invention functions, for example as shown in FIG. 1, as follows.

In the illustrated unclamping condition, the rod 4 is made free by the cancellation of the diametrical contraction of the collet 10 caused by an upward movement of the transmission member 14.

When holding and fixing the rod 4, the transmission member 14 is driven downward by the clamping piston 24, the first driving means F. Thereupon, the tapered internal peripheral surface 15 of the transmission member 14 engages smoothly with the tapered external peripheral surface 11 of the collet 10 while rolling the balls B, and diametrically contracts the collet 10 received by the stopper 22. Thereby, the diametrically contracted collet 10 pushes a holding and fixing region A of the rod 4 in a diametrical direction to clamp the rod 4 at an illustrated height.

When cancelling the foregoing clamping condition, the transmission member 14 is driven upward by the return spring 28, the second driving means S. Thereupon, the tapered internal peripheral surface 15 of the transmission member 14 moves upward smoothly while rolling the balls B, so that the foregoing engaging condition of the tapered external peripheral surface 11 of the collet 10 is cancelled. Thereby, the diametrical expansion of the collet 10 is allowed and the rod 4 is changed over to the foregoing unclamping condition.

The present invention presents the following advantages.

As mentioned above, according to the present invention, since the large number of balls B are inserted into the annular tapered clearance formed between the tapered surfaces of the transmission member and of the collet and arranged in the peripheral direction and in the axial direction, a friction acting between the foregoing tapered surfaces becomes a rolling friction, so that the friction force becomes remarkably reduced in comparison with a conventional sliding friction. Therefore, even if the taper angle for engagement is made small, the engagement between the tapered surfaces can be readily cancelled. Incidentally, according to the present invention, it becomes possible to reduce to about 2 degrees the taper angle for engagement which could be reduced merely to about 6 degrees conventionally.

As a result, the clamping device can exert a large holding and fixing force and be manufactured in small size.

Additionally, according to the present invention, since the friction force between the tapered surfaces becomes remarkably reduced, also an energy loss caused by the friction can be remarkably reduced. Therefore, by decreasing a capacity of the driving means for the transmission member, the clamping device can be manufactured in smaller size as well as a consumption amount of the driving energy is reduced.

When the large number of balls are pushed in the axial direction by the resilient member, it becomes possible to smoothly roll these balls in the orderly arranged condition. As a result, both the clamping and the unclamping can be carried out smoothly.

When the collet is pushed to the stopper by another resilient member, it becomes possible to simplify a construction for returning the collet to an initial position of a clamping cancellation condition.

Further, when spacers are mounted between the balls arranged in the axial direction, since the rolling resistance can be reduced by preventing interferences between the plurality of balls, the clamping and the clamping cancellation can be carried out more smoothly.

BRIEF DESCRIPTION OF THE DRAWINGS

FIG. 1 is a vertical sectional view of a work support using a clamping device;

FIG. 2 is an end surface view viewed in the arrow direction of the II—II line in FIG. 1;

FIG. 3 is a perspective view of a collet mounted in the clamping device;

DESCRIPTION OF THE PREFERRED EMBODIMENTS

Figure 1:
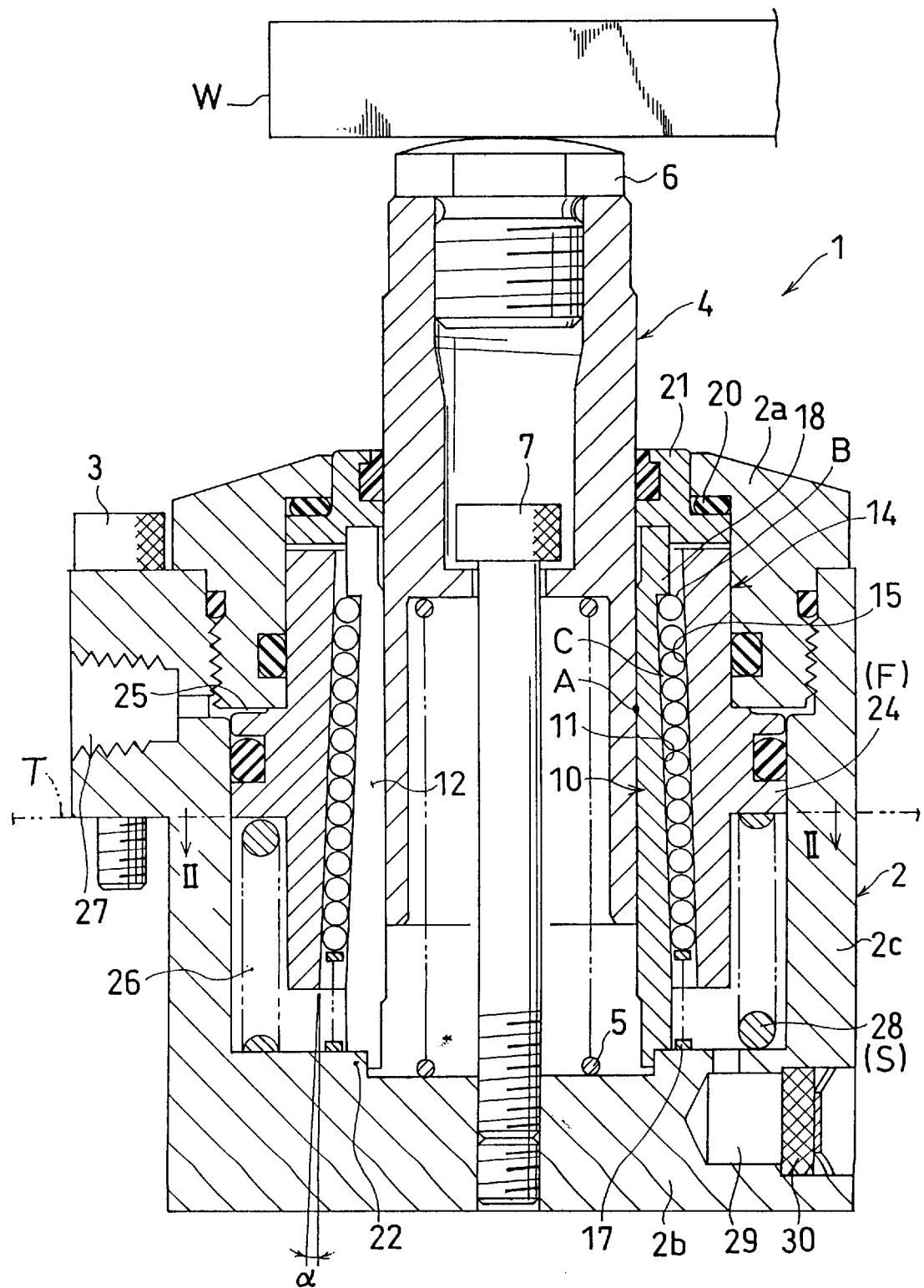
FIG. 1 to FIG. 3 show a first embodiment of the present invention.
Figure 2:
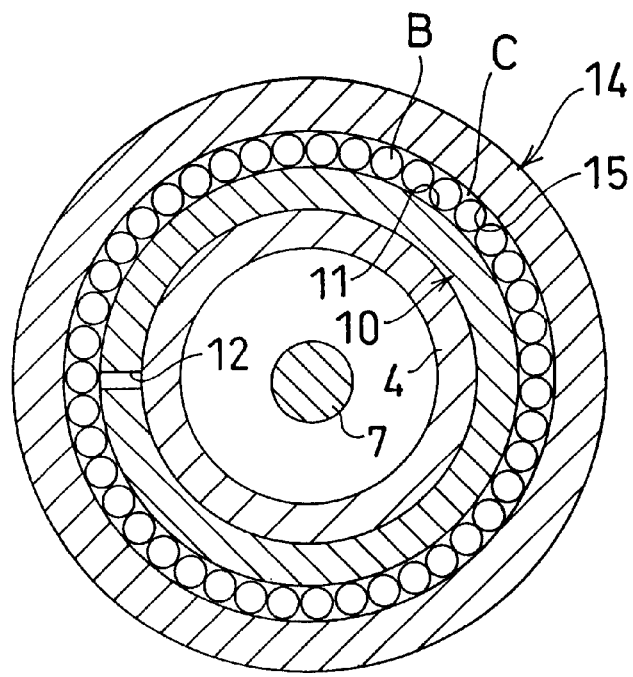
Figure 3:
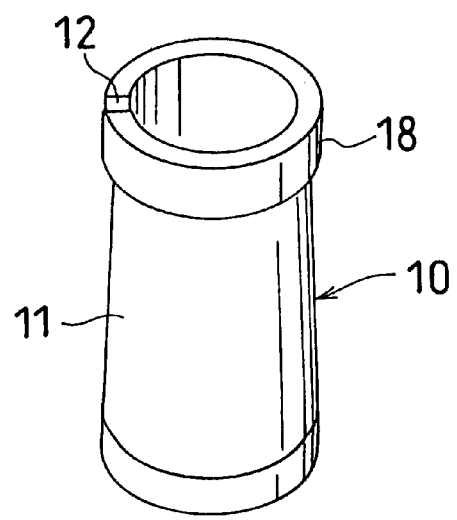

In a first embodiment shown in FIG. 1 to FIG. 3, a work support 1 is clamped by a hydraulic force and its clamping is cancelled by a spring force.

A housing 2 of the work support 1 comprises an upper end wall (a second end wall) 2a, a lower end wall (a first end wall) 2b and a barrel portion 2c and is fixedly secured to a table T by a plurality of tightening bolts 3 (herein, only one of which is illustrated). A support rod 4 is inserted into the housing 2 so as to be vertically movable. The support rod 4 is projected upward by an advancing spring 5, so that an attachment bolt 6 disposed in an upper portion of the support rod 4 is brought into contact with a workpiece W. Incidentally, a projecting length of the support rod 4 can be restricted by a restriction bolt 7.

A holding and fixing region A is provided in a lower half portion of an external peripheral surface of the support rod 4, and a cylindrical collet 10 is externally fitted to the holding and fixing region A. The collet 10 has a tapered external peripheral surface 11 getting narrower upward and is adapted to be resiliently contracted diametrically by one slit 12 extending vertically. An annular transmission member 14 is disposed outside of the collet 10, so that a tapered internal peripheral surface 15 of the transmission member 14 faces the tapered external peripheral surface 11 of the collet 10 from above.

As shown in FIG. 1, gradients α of these tapered external peripheral surface 11 and tapered internal peripheral surface 15 are set to the same value. It is preferable that a taper angle (not illustrated) having a value double the value of the gradient α is within a range from about 2 degrees to about 10 degrees, and herein, it is set to about 4 degrees.

A large number of balls B are inserted into an annular tapered clearance C formed between the tapered external peripheral surface 11 and the tapered internal peripheral surface 15. These balls B are inserted into the annular tapered clearance C being kept in contact with one another in the peripheral direction and piled up so as to contact with one another also in the axial direction.

The balls B are pushed up to an upper flange 18 of the collet 10 by a pushing spring (a resilient member) 17 and arranged orderly. The collet 10 is pushed to a stopper 22 of the lower end wall 2b by a resilient force of a pushing rubber (another resilient member) 20 and an upper sleeve 21 and positioned in an unclamping lowered condition.

A clamping piston 24 (first driving means F) is protruded from the transmission member 14 diametrically outward, so that a hydraulic actuation chamber 25 is formed above the piston 24 and a spring chamber 26 is formed thereunder. A supply and discharge port 27 for pressurized oil is connected to the actuation chamber 25, and a return spring 28 (second driving means S) is mounted into the spring chamber 26. Incidentally, a filter 30 is mounted to a breathing passage 29 of the spring chamber 26.

The workpiece W is supported by the work support 1, for example according to the following procedure.

In the clamping cancellation condition illustrated in FIG. 1, the pressurized oil is discharged from the hydraulic actuation chamber 25. The piston 24 and the transmission member 14 are moved upward by the return spring 28 to cancel the diametrical contraction of the collet 10, and the support rod 4 is projected upward by the advancing spring 5. In the clamping cancellation condition, the workpiece W is brought in from above. A main body portion of the workpiece W is received by a support (not illustrated) as well as an illustrated projecting portion thereof is brought into contact with the attachment bolt 6 of the support rod 4 from above. Thereby, the support rod 4 is retreated to the illustrated height.

After that, the pressurized oil is supplied into the hydraulic actuation chamber 25. Thereupon, the transmission member 14 is moved downward by the hydraulic force acting from the actuation chamber 25 to the piston 24, so that the tapered internal peripheral surface 15 of the transmission member 14 engages smoothly with the tapered external peripheral surface 11 of the collet 10 while rolling the balls B to diametrically contract the collet 10 received by the stopper 22. Thereby, the diametrically contracted collet 10 pushes the holding and fixing region A of the support rod 4 in a centripetal direction to hold and fix the support rod 4 at the illustrated height.

In the foregoing clamping condition, an upper surface of the workpiece W is machined, and a pushing down force during that machining is received strongly in the axial direction by a supporting force of the support rod 4.

Incidentally, after the manufacturing of a prototype in which a slide friction force acting between the tapered engagement surfaces in the above-mentioned prior art is extremely decreased and a taper angle for engagement is set to 4 degrees, the supporting force of the support rod in the conventional prototype of the slide-type was compared with the supporting force of the support rod 4 in the case that the taper angle for engagement is set to 4 degrees according to the present invention of the ball-type. The result is as follows.

When a static friction coefficient between the support rod and the collet is set to about 0.2, it can be understood that while the supporting force about 2.2 times a driving force for clamping imposed to the transmission member can be obtained in the conventional prototype, the supporting force about 4 times to about 6 times the driving force for clamping imposed to the transmission member 14 can be obtained in the present invention.

When explaining it in more detail, in the case of the present invention of the ball-type, a force about 20 times to 30 times the driving force for clamping imposed to the transmission member 14 is converted to the holding and fixing force of the collet 10 in the centripetal direction. Therefore, the supporting force obtained by multiplying that holding and fixing force by the static friction coefficient (herein, 0.2) becomes about 4 times to about 6 times the driving force for clamping. On one hand, in the case of the conventional prototype of the slide-type, a force about 11 times the driving force for clamping imposed to the transmission member is converted to the holding and fixing force of the collet in the centripetal direction. Therefore, the supporting force obtained by multiplying that holding and fixing force by the static friction coefficient (herein, 0.2) becomes about 2.2 times the driving force for clamping.

Therefore, according to the present invention, the driving means such as the clamping piston 24 or the likes may be small in size even though it has a large supporting force (namely, a large holding and fixing force), so that the work support 1 can be manufactured compactly.

It can be understood that the holding and fixing force about 2 to 3 times that in the conventional prototype can be obtained in the present invention because owing to the large number of the balls B interposed between the tapered surfaces for engagement, little loss by friction heat is produced in comparison with the slide friction.

After the completion of the foregoing machining, the pressurized oil is discharged from the hydraulic actuation chamber 25. Thereupon, the piston 24 and the transmission member 14 are pushed upward by the return spring 28 and the tapered internal peripheral surface 15 of the transmission member 14 moves smoothly upward rolling the balls B, so that the pushing condition of the tapered external peripheral surface 11 of the collet 10 is cancelled. Thereby, the collet 10 is diametrically expanded by its own resilient recovery force, so that the clamped condition of the support rod 4 can be cancelled.

The above-mentioned embodiment can further present the following advantages.

Since the tapered external peripheral surface 11, the tapered internal peripheral surface 15 and the balls B merely undergo rolling resistances very small in comparison with sliding resistance and additionally produce little aged deterioration when being subjected to a hardening treatment such quenching and the likes, their lives are long. Therefore, the work support 1 can be used for a long period of time with Maintenance free.

Further, since the balls B are accurate in diametral dimension and inexpensively available in market, the assembly accuracy of the work support 1 can be improved and also the manufacturing cost can be reduced.

In the above-mentioned first embodiment, the transmission member 14 and the piston 24 may be formed as separate members instead of the integral member formed as illustrated. Further, an urging force of the return spring 28 may be applied to the transmission member 14 instead of applying to the piston 24.

The pushing spring 17 may be arranged so as to push the balls B downward. In this case, a ball receiving flange is formed in a lower portion of the transmission member 14. The resilient member for pushing the balls B may be formed from rubber or the likes instead of the spring 17, otherwise it may be omitted.

Further, another resilient member for pushing the collet 10 to the stopper 22 may be such a spring as a coned disc spring, a compression coil spring or the likes instead of the pushing rubber 20.

Figure 4:
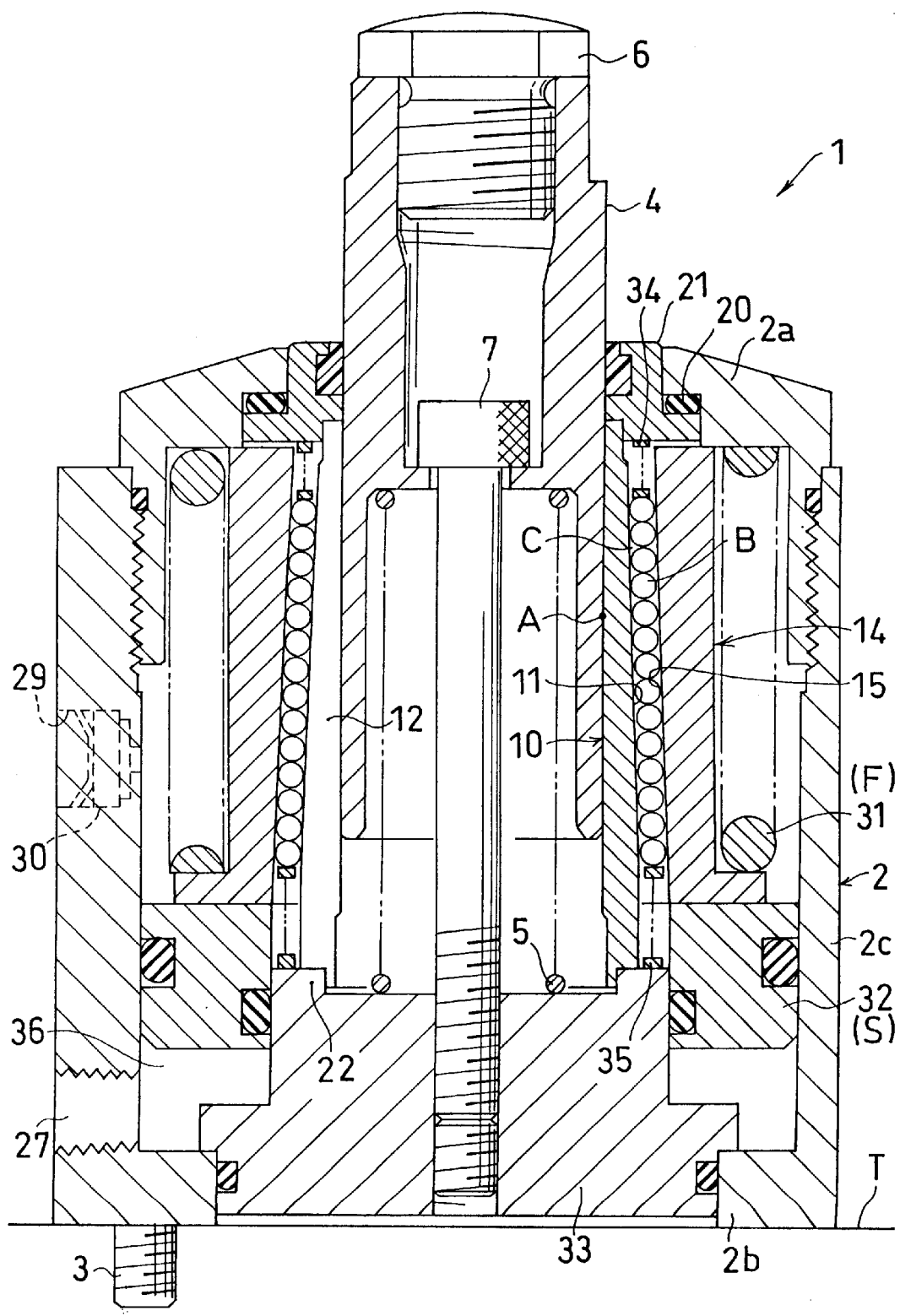
FIG. 4 shows a second embodiment of the present invention and is a view corresponding to FIG. 1.

FIG. 4 shows a second embodiment of the present invention and is a view corresponding to FIG. 1. In this second embodiment, the same component members as those of the first embodiment are designated by the same characters in principle for explanation.

In this case, the work support 1 is clamped by a spring force and its clamping is cancelled by a hydraulic force.

The transmission member 14 is urged downward by a clamping spring 31 (the first driving means F). The transmission member 14 is moved upward by an annular return piston 32 against the clamping spring 31. The piston 32 is externally fitted to a lower cap 33 constructing a bottom portion of the lower wall 2b of the housing 2, and the stopper 22 is formed in the lower cap 33. The plurality of balls B inserted into the annular tapered clearance C are arranged orderly at a midway height by an upper spring 34 and a lower one 35, the resilient members.

The return piston 32 and the transmission member 14 may be constructed integrally instead of being constructed separately.

Further, it becomes also possible to omit either or both of the upper and the lower springs 34, 35.

FIG. 5 to FIG. 8 show modifications of the present invention respectively. Also in these respective modifications, the same component members as those of the above-mentioned respective embodiments are designated by the same characters for explanation in principle.

Figure 5:
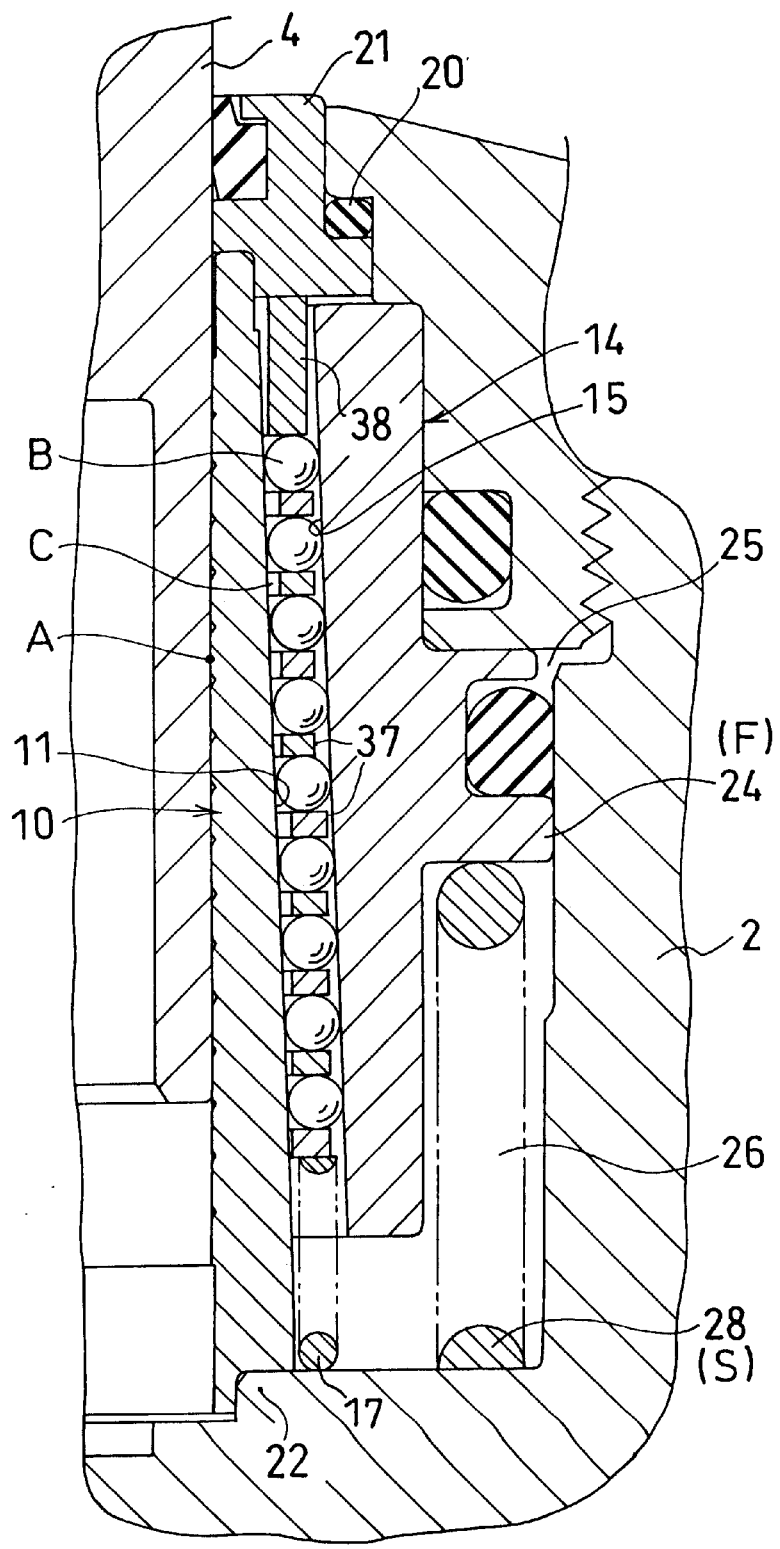
FIG. 5 shows a first modification of the present invention and is a partially enlarged view corresponding to FIG. 1.

A first modification of FIG. 5 is a partially enlarged view corresponding to FIG. 1, and the plurality of balls B pushed up by the pushing springs 17 with annular spacers 37 mounted between the balls B, B piled up within the annular tapered clearance C are received by the upper sleeve 21 through a ring 38. Thereby, it becomes possible to reduce the rolling resistance by preventing interferences between the balls B, B.

Figure 6:
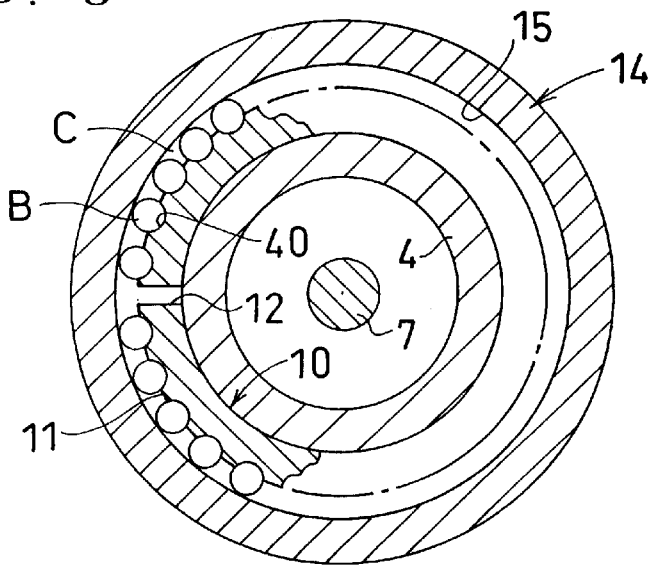
FIG. 6 shows a second modification of the present invention and is a view corresponding to FIG. 2.

A second modification of FIG. 6 is a view corresponding to FIG. 2, wherein arc grooves 40 extending in the axial direction (in the direction intersecting at right angles with respect to this paper surface) are formed in the tapered external peripheral surface 11 of the collet 10, and the balls B are held in the respective arc grooves 40.

Figure 7:
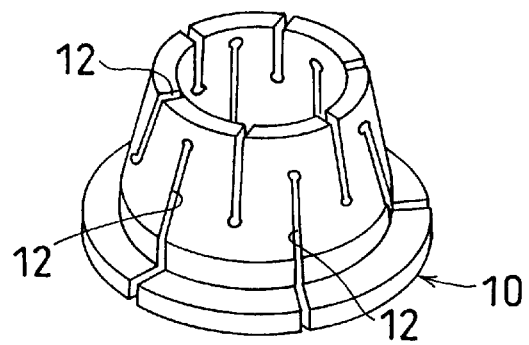
FIG. 7 shows a third modification of the present invention and is a view corresponding to FIG. 3.

A third modification of FIG. 7 is a schematic view corresponding to FIG. 3, and the plurality of slits 12 are formed in the collet 10.

Figure 8:
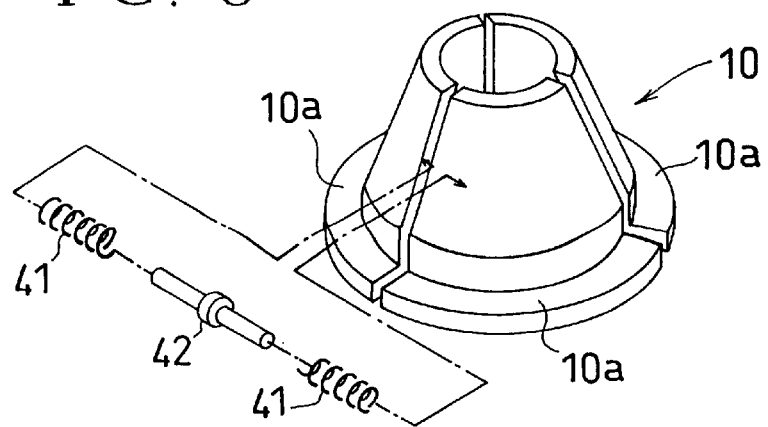
FIG. 8 shows a fourth modification of the present invention and is a view corresponding to FIG. 3.

A fourth modification of FIG. 8 is a schematic view corresponding to FIG. 3, wherein the collet 10 comprises a plurality of split members 10a, and diametrical contraction of the adjacent split members 10a, 10a are adapted to be cancelled by a spring 41 for diametrical expansion. Numeral 42 designates a guide pin. Incidentally, the split members 10a may be also so constructed that the diametrical contraction can be cancelled by their own resilient return forces.

The above-mentioned respective embodiments and modifications may be further modified as follows.

The means for advancing the support rod 4 upward may use rubber or other kinds of resilient members, or compressed air instead of the advancing spring 5.

The pressurized fluid to be supplied to the actuation chamber 25 (36) may be a gas such as air instead of a liquid such as the pressurized oil.

The work support 1 may be also so placed that its axis extends in a horizontal direction or in an inclined direction instead of being so placed that the axis of the support rod 4 extends in the vertical direction.

Further, the clamping device of the present invention may be applied to a use for locking and unlocking a piston rod of a fluid-pressure cylinder apparatus or a use for locking and unlocking a rod attached to a moving body such as an elevator, a conveyance pallet and so on instead of being applied to the work support 1.

What is claimed is:

1. A clamping device comprising:

a housing (2) having a first end, a second end and an annular barrel portion (2c), a rod (4) being inserted into the housing (2);

a collet (10) having a tapered external peripheral surface (11) and being externally fitted onto the rod (4);

a transmission member (14) having a tapered internal peripheral surface (15) facing the tapered external peripheral surface (11) from outside;

an annular tapered clearance (C) formed between the tapered internal peripheral surface (15) and the tapered external peripheral surface (11);

a large number of balls (B) inserted into the annular tapered clearance (C) and arranged in a peripheral direction and in an axial direction;

a first driving means (F) which diametrically contracts the collet (10) through the balls (B) by moving the transmission member (14) toward the first end, the first driving means (F) being arranged in an annular space defined between the transmission member (14) and the barrel portion (2c) of the housing (2);

a stopper (22) which prevents the diametrically contracted collet (10) from moving toward the first end; and a second driving means (S) which cancels the diametrical contraction of the collet (10) by moving the transmission member (14) toward the second end.

2. A clamping device as set forth in claim 1, which further comprises:

a resilient member (17) which pushes the large number of balls (B) in the axial direction of the annular tapered clearance (C).

3. A clamping device as set forth in claim 2, which further comprises:

another resilient member (20) which pushes the collet (10) to the stopper (22).

4. A clamping device as set forth in claim 2, which further comprises a spacer (37) mounted between the balls (B), (B) arranged in the axial direction.

5. A clamping device as set forth in claim 2, wherein the first driving means (F) includes a clamping piston (24), and the second driving means (S) includes a return spring (28).

6. A clamping device as set forth in claim 2, wherein the first driving means (F) includes a clamping spring (31), and the second driving means (S) includes a return piston (32).

7. A clamping device as set forth in claim 1, which further comprises:

a resilient member (20) which pushes the collet (10) to the stopper (22).

8. A clamping device as set forth in claim 7, which further comprises a spacer (37) mounted between the balls (B), (B) arranged in the axial direction.

9. A clamping device as set forth in claim 7, wherein the first driving means (F) includes a clamping piston (24), and the second driving means (S) includes a return spring (28).

10. A clamping device as set forth in claim 7, wherein the first driving means (F) includes a clamping spring (31), and the second driving means (S) includes a return piston (32).

11. A clamping device as set forth in claim 1, which further comprises a spacer (37) mounted between the balls (B),(B) arranged in the axial direction.

12. A clamping device as set forth in claim 1, wherein the first driving means (F) includes a clamping piston (24), and the second driving means (S) includes a return spring (28).

13. A clamping device as set forth in claim 1, wherein the first driving means (F) includes a clamping spring (31), and the second driving means (S) includes a return piston (32).

14. A clamping device as set forth in claim 1, which further comprises:

a first end wall (2b) formed at the first end of the housing (2);

a second end wall (2a) formed at the second end of the housing (2);

an advancing spring (5) which urges the rod (4) toward the second end wall (2a);

a holding and fixing region (A) formed on an external peripheral surface of the rod (4);

an internal peripheral surface of the collet (10) which contacts the holding and fixing region (A);

wherein the tapered external peripheral surface (11) of the collet (10) and the tapered internal peripheral surface (15) of the transmission member (14) both taper inwardly in a direction toward the second end wall (2a), and wherein the stopper (22) contacts the first end wall (2b) such that a force acting on the rod (4) toward the first end wall (2b) is transmitted through the holding and fixing region (A), the collet (10) and the stopper (22) to the first end wall (2b) when the collet (10) is diametrically contracted by the first driving means (F).

* * * * *

(12) EX PARTE REEXAMINATION CERTIFICATE (5554th)
United States Patent
Yonezawa

(10) Number: US 5,979,267 C1
(45) Certificate Issued: Oct. 10, 2006

(54) CLAMPING DEVICE

(75) Inventor: Keitaro Yonezawa, Kobe (JP)

(73) Assignee: Kabushiki Kaisha Kosmek, Kobe (JP)

Reexamination Request:
No. 90/007,364, Jan. 3, 2005

Reexamination Certificate for:
Patent No.: 5,979,267
Issued: Nov. 9, 1999
Appl. No.: 08/964,873
Filed: Nov. 5, 1997

(30) Foreign Application Priority Data

Nov. 12, 1996 (JP) .............................. 8-299172

(51) Int. Cl.
*G05G 5/06* (2006.01)
*B23B 5/22* (2006.01)

(52) U.S. Cl. ........................... 74/531; 74/527; 279/4.07
(58) Field of Classification Search ....................... None
See application file for complete search history.

(56) References Cited

FOREIGN PATENT DOCUMENTS

| GB | 548690 | * | 10/1942 |
| JP | 63-38705 A | * | 2/1988 |
| JP | 63038705 A | * | 2/1988 |
| JP | 06007868 A | * | 1/1994 |
| JP | 6-7868 Y2 | * | 3/1994 |

* cited by examiner

*Primary Examiner*—Peter C. English

(57) ABSTRACT

An annular collet (10) is externally fitted to a support rod (4) inserted into a housing (2), and an annular transmission member (14) is arranged around the collet (10) with an annular tapered clearance (C) interposed therebetween. A large number of balls (B) inserted into the annular tapered clearance (C) are pushed up by a pushing spring (17). When pressurized oil is supplied to a hydraulic actuation chamber (25), a clamping piston 24 moves the transmission member (14) downward, so that a tapered internal peripheral surface (15) of the transmission member (14) gets engaged with a tapered external peripheral surface (11) of the collet (10) while rolling the balls (B). Thereby, the collet (10) is diametrically contracted.

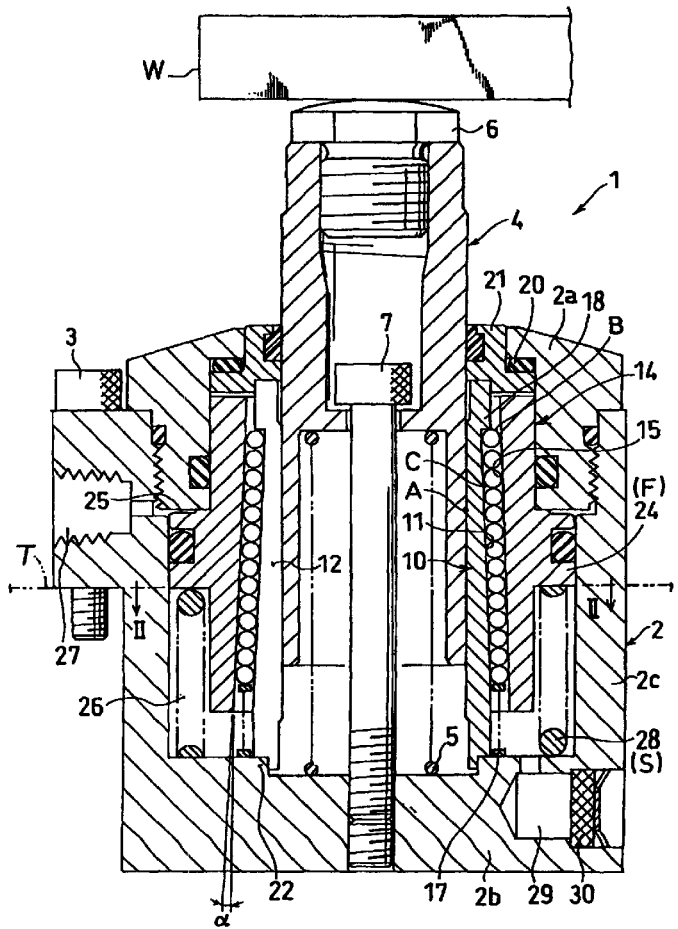

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 3 and 7–10 are cancelled.

Claim 1 is determined to be patentable as amended.

Claims 2, 4–6 and 11–14, dependent on an amended claim, are determined to be patentable.

1. A clamping device comprising:
   a housing (2) having a first end, a second end and an annular barrel portion (2c), a rod (4) being inserted into the housing (2);
   a collet (10) having a tapered external peripheral surface (11) and being externally fitted onto the rod (4), *the collet (10) having limited axial movement relative to said housing*;
   a transmission member (14) having a tapered internal peripheral surface (15) facing the tapered external peripheral surface (11) from outside;
   an annular tapered clearance (C) formed between the tapered internal peripheral surface (15) and the tapered external peripheral surface (11);
   a large number of balls (B) inserted into the annular tapered clearance (C) and arranged in a peripheral direction and in an axial direction;
   a first driving means (F) which diametrically contracts the collet (10) through the balls (B) by moving the transmission member (14) toward the first end, the first driving means (F) being arranged in an annular space defined between the transmission member (14) and the barrel portion (2c) of the housing (2);
   a stopper (22) which prevents the diametrically contracted collet (10) from moving toward the first end; [and]
   a second driving means (S) which cancels the diametrical contraction of the collet (10) by moving the transmission member (14) toward the second end *and a resilient member (20) urging said collet (10) toward said stopper (22) to an unclamping position, said resilient member (20) acting between the collet (10) and a fixed housing member.*

\* \* \* \* \*